Feb. 18, 1958 G. V. JAKEWAY ET AL 2,823,886
LOCKING MEANS FOR GAS VALVE
Filed Aug. 25, 1952 2 Sheets-Sheet 1
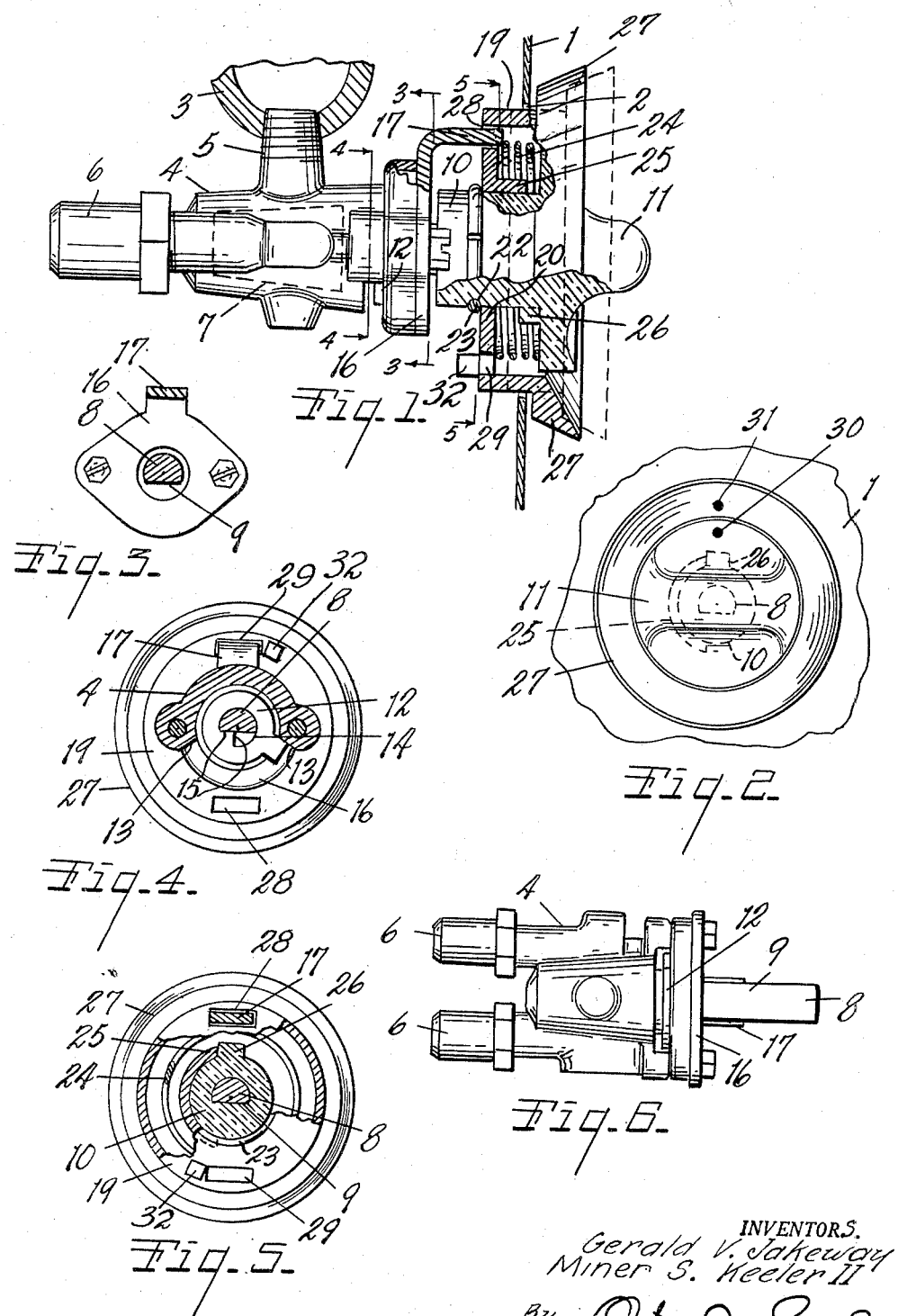

Feb. 18, 1958  G. V. JAKEWAY ET AL  2,823,886
LOCKING MEANS FOR GAS VALVE
Filed Aug. 25, 1952  2 Sheets-Sheet 2

INVENTORS
Gerald V. Jakeway
Miner S. Keeler II
BY
Attorney.

United States Patent Office 2,823,886
Patented Feb. 18, 1958

2,823,886

LOCKING MEANS FOR GAS VALVE

Gerald V. Jakeway and Miner S. Keeler II, Grand Rapids, Mich., assignors to Keeler Brass Company, Grand Rapids, Mich.

Application August 25, 1952, Serial No. 306,258

5 Claims. (Cl. 251—104)

This invention relates to improvements in a gas valve. The main objects of the invention are:

First, to provide a gas valve which is particularly adapted for use in domestic stoves and ranges, which includes means for locking the valve in closed position of a character preventing opening of the valve by children.

Second, to provide a valve having this advantage which may be easily unlocked and operated by adults or others who have reached the age of understanding the dangers in turning on a gas valve without igniting the burners supplied thereby.

Third, to provide a gas valve having these advantages in which the exposed operating parts are attractive and generally ornamental in character, and one which may be economically produced.

Objects relating to details and economies of the invention will appear from the description to follow. The invention is defined and pointed out in the claims.

A preferred embodiment of the invention is illustrated in the accompanying drawing, in which:

Fig. 1 is an elevational view of a gas valve embodying our invention partially broken away and in section, the valve being shown in open position and in association with a supply manifold and the front wall of a stove or range, and being considerably enlarged as compared to the commercial structure, the locking member being shown by full lines in retracted non-rotatable position and by dotted lines in released or advanced rotatable position. The locking member is in angularly rotated position to unlock the valve. The valve element is indicated by dotted lines.

Fig. 2 is a fragmentary front elevational view of the valve in closed locked position.

Fig. 3 is a detailed view in section on a line corresponding to line 3—3 of Fig. 1 with the valve in closed position, the lock structure not appearing in this view.

Fig. 4 is a fragmentary view in section on a line corresponding to line 4—4 of Fig. 1 with the valve in closed locked position as in Fig. 2.

Fig. 5 is a fragmentary view partially in section on a broken line 5—5 of Fig. 1 with the valve in closed unlocked position.

Fig. 6 is an inverted view with the handle or finger piece and the adjustable locking element omitted.

Fig. 7 is an exploded perspective view of the valve locking parts.

Figure 1:
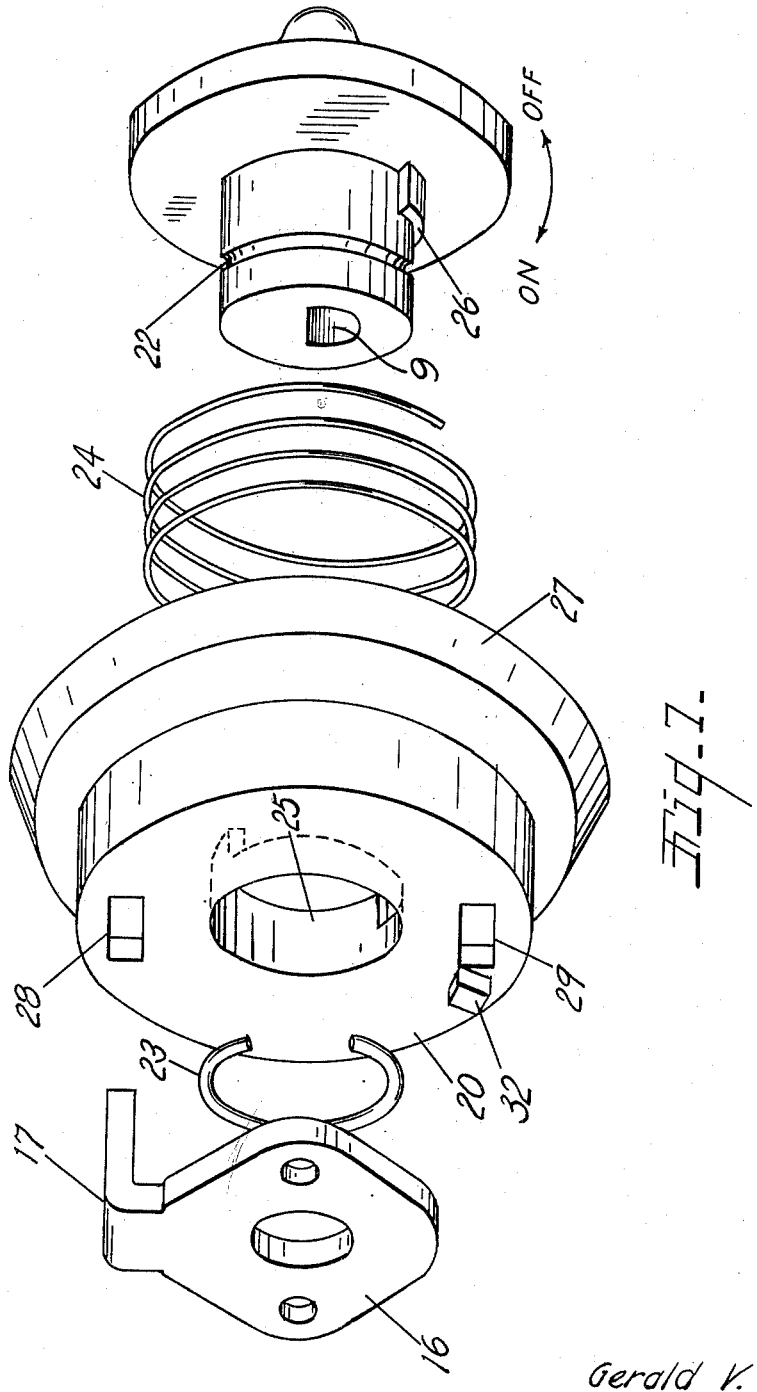

In the accompanying drawing, 1 represents the front wall of a stove or range or other heating gas appliance having an opening 2 therein, and 3 represents a gas supply manifold. The embodiment of the invention illustrated comprises a valve body member designated generally by the numeral 4 and having a threaded connector 5 which is tapered and threaded into an opening provided therefor in the gas manifold or supply conduit. The valve illustrated is provided with two delivery nozzles 6. These are commonly associated with burners having air mixing tubes. The burners and their mixing tubes may be conventional and therefore are not illustrated.

The valve element 7, shown conventionally by dotted lines, is rotatable within the body. The stem 8 of the valve 7 projects forwardly and has a flattened or non-circular portion 9 on which the hub 10 of the handle or finger piece 11 is sleeved. The finger piece 11 and its hub 10, in the embodiment illustrated, are formed integrally. On the valve stem is a stop member 12 which coacts with spaced stops 13 on the valve body, see Fig. 4. The opening 14 in the stop member 12 has a circular portion embracing about three quarters thereof providing a pair of stops 15 disposed in 45 degrees angular relation and permitting 45 degrees rotation of the stem without moving the stop member 12.

A locking stop member 16 is fixedly secured to the valve body and provided with a forwardly projecting locking member 17 which coacts with the locking member 19 which is axially slidable and rotatably adjustably mounted on the hub portion 10 of the stem finger piece. This locking member 19 is provided with an inturned flange 20 slidably and rotatably engaging the finger piece hub, the hub being provided with an annular groove 22 receiving the split retaining ring 23 which, in addition to retaining the locking member 19, serves as a stop abutment therefor.

The locking member is urged yieldingly toward locking engagements with the member 17 or a retracted position by means of the compression spring 24 arranged about the hub with its forward end engaging the finger piece and its rear end the flange 20 of the locking member. The flange 20 of the locking member is provided with a segmental stop 25 which projects forwardly to coact with the stop 26 on the hub 10 as is best shown in Figs. 1, 2 and 5. The locking member is provided with an annular grip or finger piece 27 surrounding the finger piece of the valve stem and constituting a bezel therefor. The locking member is commercially designated as a bezel. The flange 20 of the locking or bezel member 19 is provided with a pair of keeper openings 28 and 29 disposed in the embodiment illustrated in 180 degrees angular relation and adapted to receive the relatively fixed detent or locking dog 17.

The operation of the valve 7 and locking member 19 is as follows: in the position of the parts as shown in Fig. 1 the valve 7 is open and the flattened portion 9 of the stem is up. The parts are in opposite positions from those shown in Figs. 2, 3, 4 and 5. In this open position the stop member 12, which appears in Fig. 4, will be against the left stop 13 as viewed from the back and the flat of stem 9 will be against the vertical stop surface 15 of the stop member 12 opposite from the positions in Fig. 4. The segmental stop 25 in Fig. 1, is in unlocked position as appears in Fig. 5. To close the valve the finger piece 11 is turned clockwise as viewed from the front or counter clockwise as viewed in Figs. 4 and 5 to the positions shown in Figs. 2, 4 and 5. The finger piece 27 of the locking member 19 is then pulled forward out of engagement with the locking dog 17 and similarly rotated clockwise as viewed from the front from the position shown in Fig. 5 until the opening 29 registers with and receives the dog 17 as in Fig. 4.

In the valve closed and locked position of the parts as shown in Figs. 2 and 4 two indicia marks 30 and 31 on the valve finger piece 11 and lock member 27 respectively are in adjacent registering relation. The valve is held against further rotation in a closing direction by engagement of the stop member 12 with the stop 13 as appears in Fig. 4. The valve is held against opening motion by engagement of the stop 26 with the segmental stop 25 as in Fig. 2 and the segmental stop 25 and lock member 19 are held against movement by engagement of the locking member 17 in the opening 29 as in Fig. 4. To open the valve it is first necessary to unlock it by again pulling out the lock member finger piece 27 and rotating it counterclockwise as viewed from the front to the position shown in Fig. 5. The valve and its stop 26 can then be rotated behind the lock member 19 to the position shown in Fig. 1.

Rotation of the bezel or locking member to locked position automatically closes the valve through engagement of stops 25 and 26. To facilitate adjustment a stop 32 is provided at one end of the keeper opening 29 so that on the locking movement of the bezel member the stop 32 is engaged and aligns the keeper opening with the locking detent 17. The friction of the tightly fitting valve member 7 in the body 4 is normally greater than the friction of the spring 24 and locking member 19 on the finger piece 11 so that rotation of the locking member to unlocked position will not move the finger piece and valve to open position. Should the friction of the valve member in the valve body be insufficient to resist rotation with the locking member, antifriction means (not illustrated) may be provided between the locking member and valve finger piece. As pointed out above, the return motion of the locking member to locked position positively returns the valve finger piece to off position but closing motion of the valve finger piece does not return the locking member 19 because the locking member is positively held in unlocked position by the locking member 17.

The embodiment of our invention illustrated is readily adapted to various stoves and range structures now in extensive use. We have not attempted to illustrate or describe certain modifications which might be required or desirable for such installations as we believe this disclosure will enable those skilled in the art to embody or adapt our invention as may be desired.

Having thus described my invention, what we claim as new and desire to secure by Letters Patent is:

1. A gas valve comprising a valve body and coacting valve rotatably mounted therein, a valve stem having a finger piece provided with a hub portion and a laterally projecting flange at the outer end of the hub portion, angularly spaced open and closed stops on said body member, a coacting stop member on said stem engageable with said stops to limit the opening and closing movement of the valve, a bezel member having a grip portion surrounding said flange of said finger piece, and having a barrel portion spaced from and surrounding the hub portion of the finger piece and provided at its inner end with an inwardly projecting flange slidably and rotatably mounted on the said hub and having angularly spaced locking stop keeper openings, the hub portion of said finger piece having a peripheral groove therein, a split ring engaged in said groove for limiting the inward movement of the bezel member relative to the finger piece, a coil compression spring arranged between said bezel member flange and the flange on said finger piece to bias said bezel member to inward retracted position, a locking stop mounted on said valve body and provided with a forwardly projecting stop finger with which the said keeper openings in said bezel member may be selectively engaged in either a valve locking or valve unlocked position, a radially projecting stop lug on said hub, and a segmental stop on the flange of said bezel member disposed in the plane of said stop lug, one end of said segmental stop in the valve locking position of said bezel member engaging said stop lug on said hub in opposition to the limiting engagement between the stop member on said stem and said closed stop whereby in the valve locking position of the bezel member the segmental stop-hub stop lug engagement prevents an opening rotation of the valve and the stem stop member-closed body stop engagement prevents further closing rotation movement of the valve and movement of the bezel member to valve unlocked position locates the segmental stop out of the path of movement of the hub stop lug during valve opening movement.

2. A gas valve comprising a valve body and coacting valve rotatably mounted therein, a valve stem having a finger piece provided with a hub portion and a laterally projecting flange at the outer end of the hub portion, angularly spaced open and closed stops on said body member, a coacting stop member on said stem engageable with said stops to limit the opening and closing movement of the valve, a bezel member having a grip portion surrounding said flange of said finger piece, and having a barrel portion spaced from and surrounding the hub portion of the finger piece and provided at its inner end with an inwardly projecting flange slidably and rotatably mounted on the said hub and having angularly spaced locking stop keeper openings, a coil compression spring arranged between said bezel member flange and the flange on said finger piece to bias said bezel member to inward retracted position, a locking stop mounted on said valve body and provided with a forwardly projecting stop finger with which the said keeper openings in said bezel member may be selectively engaged in either a valve locking or valve unlocked position, a radially projecting stop lug on said hub, and a segmental stop on said bezel member disposed in the plane of said stop lug, one end of said segmental stop in the valve locking position of said bezel member engaging said stop lug on said hub in opposition to the limiting engagement between the stop member on said stem and said closed stop whereby in the valve locking position of the bezel member the segmental stop-hub stop lug engagement prevents an opening rotation of the valve and the stem stop member-closed body stop engagement prevents further closing rotation movement of the valve and movement of the bezel member to valve unlocked position locates the segmental stop out of the path of movement of the hub stop lug during valve opening movement.

3. A gas valve comprising a valve body and coacting valve rotatably mounted therein, a valve stem having a finger piece provided with a hub portion and a laterally projecting flange at the outer end of the hub portion, angularly spaced open and closed stops on said body member, a coacting stop member on said stem engageable with said stops to limit the opening and closing movement of the valve, a bezel member having a grip portion surrounding said flange of said finger piece, and having a barrel portion spaced from and surrounding the hub portion of the finger piece and provided at its inner end with an inwardly projecting flange slidably and rotatably mounted on the said hub and having angularly spaced locking stop keeper openings, a coil compression spring arranged between said bezel member flange and the flange on said finger piece to bias said bezel member to inward retracted position, a locking stop mounted on said valve body and provided with a forwardly projecting stop finger with which the said keeper openings in said bezel member may be selectively engaged in either a valve locking or valve unlocked position, a radially projecting stop lug on said hub, and a segmental stop on said bezel member disposed in the plane of said stop lug, one end of said segmental stop in the valve locking position of said bezel member engaging said stop lug on said hub in opposition to the limiting engagement between the stop member on said stem and said closed stop whereby in the valve locking position of the bezel member the segmental stop-hub stop lug engagement prevents an opening rotation of the valve and the stem stop member-closed body stop engagement prevents further closing rotation movement of the valve and movement of the bezel member to valve unlocked position locates the segmental stop out of the path of movement of the hub stop lug during valve opening movement, said bezel member having an inwardly projecting stop at the end of one of said keeper openings and engageable with stop finger to register said keeper opening with the finger at the end of the locking rotation of the bezel.

4. A gas valve comprising a valve body and coacting valve rotatably mounted therein and having a valve stem provided with a finger piece, coacting stops on said stem and valve body limiting the opening and closing movement of the valve, a lock member having a grip portion surrounding said finger piece, said valve stem finger piece having an inwardly projecting hub portion, said lock member being chambered and longitudinally slidable and rotatable on said hub portion and having angularly spaced locking stop keepers, a stop on said hub portion limiting the inward movement of the lock member, a spring housed within said lock member acting to bias the lock member inward to retracted position, a locking stop on said valve body with which said keepers may be alternatively engaged in angularly rotated positions and in the retracted position of the lock member to prevent rotation of the lock member in either direction, coacting stops on said lock member and finger piece limiting the rotation of said stem and finger piece in a valve opening direction when said locking stop is engaged with one of said locking stop keepers and located to permit the full valve opening and closing movement of the finger piece when the locking stop is engaged with the other of said keepers, said last coacting stops acting to close the valve when the locking member is rotated to register said locking stop with said one of said keepers.

5. A gas valve comprising a valve body and coacting valve rotatably mounted therein and having a valve stem provided with a finger piece, coacting stops on said stem and valve body limiting the opening and closing movement of the valve, a lock member having a grip portion surrounding said finger piece, said lock member being longitudinally slidable and rotatable relative to said stem and having angularly spaced locking stop keepers, a spring acting to bias the lock member inward to retracted position, a locking stop on said valve body with which said keepers may be alternatively engaged in angularly rotated positions and in the retracted position of the lock member to prevent rotation of the lock member in either direction, coacting stops on said lock member and finger piece limiting the rotation of said stem and finger piece in a valve opening direction when said locking stop is engaged with one of said locking stop keepers and located to permit the full valve opening and closing movement of the finger piece when the locking stop is engaged with the other of said keepers, said last coacting stops acting to close the valve when the locking member is rotated to register said locking stop with said one of said keepers.

References Cited in the file of this patent

UNITED STATES PATENTS 1,266,937   Haselwander _____ May 21, 1918

FOREIGN PATENTS 214,781   Great Britain _____ of 1924